United States Patent [19]
Colvin

[11] Patent Number: 4,782,321
[45] Date of Patent: Nov. 1, 1988

[54] AUTO ALARM SYSTEM

[75] Inventor: James R. Colvin, Houston, Tex.

[73] Assignee: Victor Branch, Houston, Tex.

[21] Appl. No.: 868,148

[22] Filed: May 27, 1986

Related U.S. Application Data

[63] Continuation-in-part of Ser. No. 706,598, Feb. 28, 1985, abandoned.

[51] Int. Cl.4 .............................................. B60R 25/00
[52] U.S. Cl. ................................. 340/63; 307/10 AT
[58] Field of Search .................. 340/63, 64, 541, 542; 307/10 AT; 180/287; 70/252, DIG. 49; 200/44, 45

[56] References Cited

U.S. PATENT DOCUMENTS

| | | | |
|---|---|---|---|
| 1,239,602 | 9/1917 | Johnston | 340/63 |
| 4,319,230 | 1/1980 | Fowler et al. | 340/539 |
| 4,449,605 | 5/1984 | Read | 340/64 X |

Primary Examiner—Joseph A. Orsino, Jr.
Assistant Examiner—Jeffery A. Hofsass
Attorney, Agent, or Firm—David M. Ostfeld

[57] ABSTRACT

An alarm system for a vehicle is disclosed. The alarm system is responsive to theft of the vehicle either by pulling the lock mechanism or by starting of the vehicle through the forced entry of the bowl plate. The alarm system further includes a signal system remote from the detection system for emitting a single frequency for detection remote from the vehicle. The detector may include distance and direction detection from the detector to the vehicle.

5 Claims, 3 Drawing Sheets

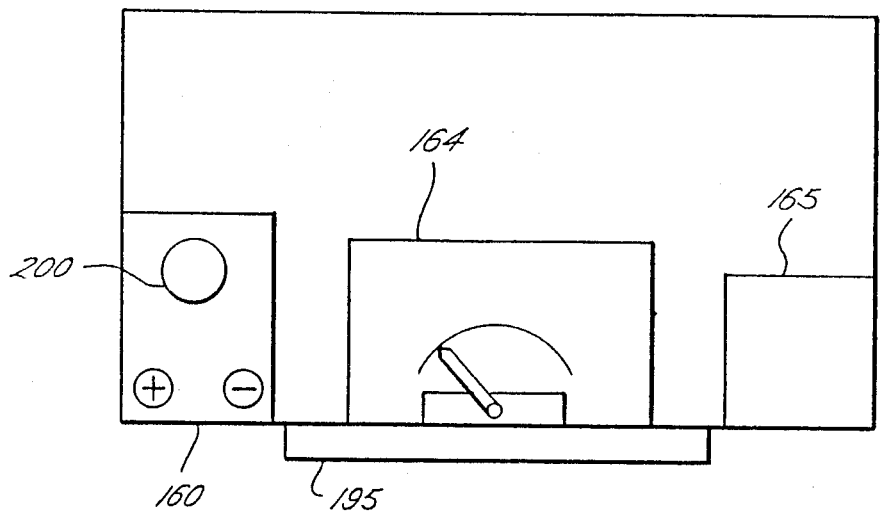
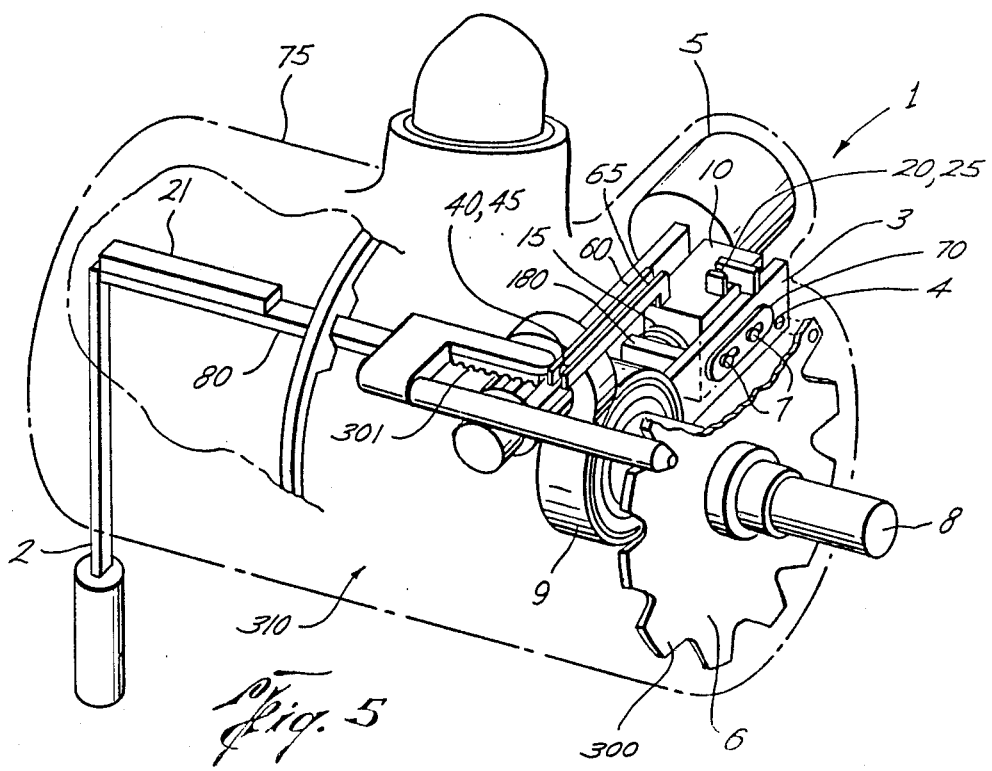

AUTO ALARM SYSTEM

CROSS REFERENCE TO RELATED APPLICATIONS

This application is a continuation-in-part of U.S. application Ser. No. 706,598, filed Feb. 28, 1985, by James Colvin, entitled "Auto Alarm System," now abandoned.

TECHNICAL FIELD

This invention relates to silent vehicle alarm systems and more particularly to silent alarm systems for vehicle theft through the act of starting the vehicle.

BACKGROUND ART

There are many appraoches taught in the prior art for vehicle theft detection devices. Many of these systems use some sort of transmitting system. See, for example, U.S. Pat. No. 4,012,728 to Fowler; U.S. Pat. No. 4,319,230 to Fowler, et al.; U.S. Pat. No. 3,665,312, to Jarvis; U.S. Pat. No. 4,187,497 to Howell et al; U.S. Pat. No. 3,357,020 to Slifer, Jr.; U.S. Pat. No. 4,177,466, to Reagan; and U.S. Pat. No. 3,357,020 to Slifer, Jr.; U.S. Pat. No. 4,177,466, to Reagan; and U.S. Pat. No. 4,188,614 to Habib et al. Many of these, such as Fowler, Jarvis and Howell use a mechanism for detecting the theft of the device. For example, Fowler discloses a burglar alarm system which utilizes an electric back-up circuit. When the electrical conductor of the burglar alarm system is cut, a lock-in relay is operated to close the back-up circuit and actuate a radio transmitter to transmit radio signals to a receiver that indicated that an electrical conductor of the burglar alarm has been cut. Jarvis discloses an alarm and monitoring system for a vehicle in which a transmitter is activated upon illegal entry into, or theft of, the vehicle. The transmitter sends out a coded signal which identifies the vehicle. The signal is sent out sequentially on different frequencies with a predetermined and different time interval between each transmission. The received signals are utilized to locate the vehicle by triangulation techniques. Howell et al discloses a portable vehicle alarm system having a motion sensitive switch in a transmitter for transmitting an alarm to a remote receiver. The receiver is capable of several functions, including silent alarm to police or security guards, as well as visual and audible signals at remote locations. Further, U.S. Pat. No. 1,239,602 to Johnston, shows a steering shaft with a special protective housing constructed to include sounding an alarm if the housing is disturbed, but fails to show any alarm system responsive to tampering with the starting mechanism of the vehicle. U.S. Pat. No. 4,449,605, to Read shows a system associated with starting the vehicle after partially destroying the starting mechanism, which system prevents car movement and therefore has no alarm nor suggests an alarm. Also, the Read system is actuated by starting the vehicle rather than by the removal of a portion of the starting mechanism. U.S. Pat. No. 3,629,818, to Yokohama, et al. shows a dual test alarm system for the open door of the vehicle with the steering shaft unlocked and does not disclose an alarm intrusive to the starting mechanism with the door closed. In addition, Habib et al discloses a remote alarm system for preventing of motorcycles, bikes or other similar devices from theft. The alarm system includes a housing which is positioned on a support surface for cooperative engagement with a wheel of the vehicle.

Many other techniques have also been discovered for prevention of theft. For example, see U.S. Pat. No. 3,947,693, to Eskenas. Eskenas discloses an electrical pushbutton ignition combination lock wired into the electrical circuit of the motor of the vehicle. The proper combination of buttons must be pushed to energize a relay to complete the ignition circuit. Pressing any of the other buttons simply grounds the circuit and disables the unlocking mechanism.

However, none of the above-referenced prior art discloses a system specifically adapted to respond to the removal of the lock cylinder in the steering column or steering column intrusive starting techniques, despite the fact that most thefts involving vehicles result from a removal of the lock mechanisms from the steering column or breaking into steering columns that have no special locks. In addition, most signal devices of the prior art are very complex and not easily adapted to present police procedures.

It is an object of the present invention to teach apparatus that responds to the removal of an ignition lock to cause a silent alarm, or audible if required, to respond to the event.

It is a further object of the present invention to teach apparatus for signaling the presence of a stolen vehicle to policemen in the vicinity.

DISCLOSURE OF THE INVENTION

A silent alarm system and apparatus for a response to the removal of the lock cylinder or for a response to the starting of the vehicle by breaking through the bowl plate and manually starting the vehicle from a steering column is disclosed. The system is partially mounted into the interior of the steering column and is spring loaded against the lock mechanism of the steering column. Upon activation by removal of the lock cylinder or manual starting of the vehicle through the bowl plate of the steering column mechanism, a mechanical linkage to the activating switch of the alarm system would melt. This linkage, when released, would force the completion of an electrical circuit to a high frequency radio signal unit. A patrol car through a remote detection unit in the nearby vicinity could then detect the signal of the stolen vehicle through a remote detection unit. Because the system could be hidden in the vehicle, it would be difficult to find and would give the patrolman an opportunity to pick it up on the remote unit.

BRIEF DESCRIPTION OF THE DRAWINGS

For a further understanding of the nature and objects of the present invention, reference is made to the following drawings in which like parts are given like reference numerals and wherein:

FIG. 4 is a schematic view of the detection apparatus of the preferred embodiment of the present invention;

FIG. 5 is a partial, elevated view of the steering column showing details of placement of the alarm activat

PREFERRED MODE FOR CARRYING OUT THE INVENTION

Figure 1:
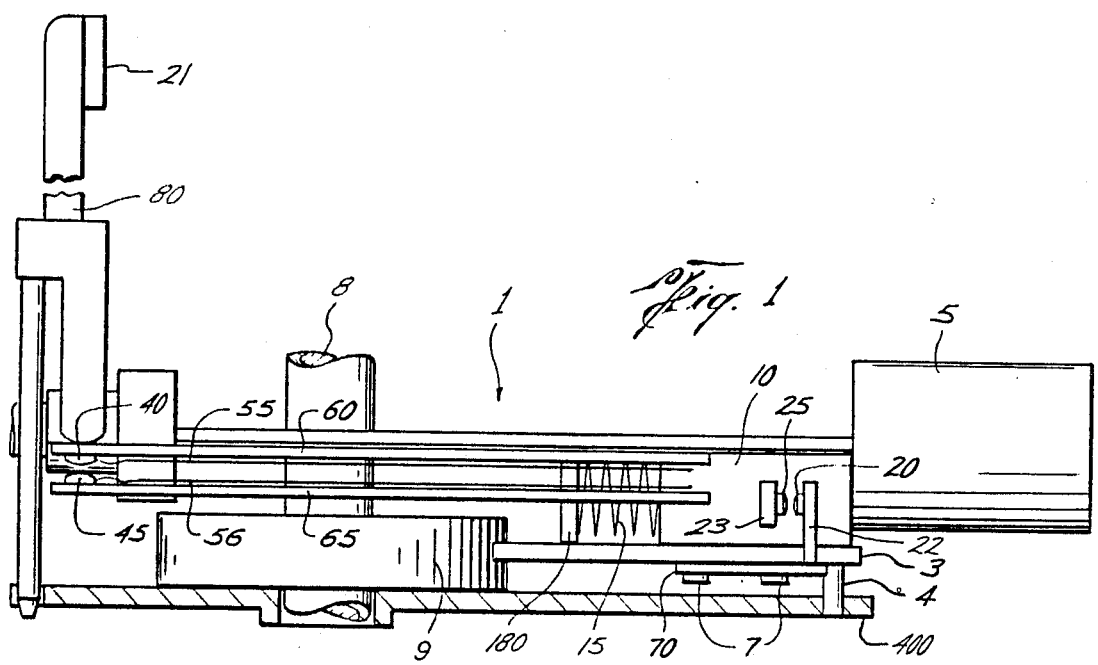
FIG. 1 is a plan, partial sectional view of a steering column and lock mechanism with integral alarm system of the preferred embodiment of the present invention.

Referring to FIGS. 1 and 5, there is shown the detection mechanism 1 of the present invention. The detection mechanism 1 is located at the lower turn signal housing 6 of a vehicle (not shown) and is mounted with screw 4 and bearing assembly 9 to secure mechanism 1 in a fixed position. Mechanism 1 abuts lock cylinder 5 and is housed in a contact mechanism box 10. Mechanism box 10 is mounted in the rear of lock mechanism 5 through oval mounting bracket 70 by use of a metal bar 3. The metal bar 3 is mounted to bearing assembly 9 (FIGS. 1, 2, 5) of steering shaft 8 under a turn signal mounting plate 400 which is under the steering wheel locking plate 300. The bearing assembly 9 prevents rotation of the bar 3. Screw 4 holds metal bar 3 to the bottom of turn signal mounting plate 400. Oval mounting bracket 70 is mounted to metal bar 3 by screws 7. A projector rod 80 is mounted in a bowl plate 75 with mechanical finger 301 to secure the steering wheel locking plate 300 in the lock position. A thief breaking in bowl plate 75 would apply upward force to a rack 21 or projector rod 80, or both, by a screwdriver 2 or other mechanism to unlock steering wheel locking palte 300 and engage the ignition to steal the vehicle (not shown).

As shown in FIG. 5, the bowl plate 75 is a protective cover mounted to the lower lock cylinder housing 310 to protect projector 80 and rack 21. Plate 75 is constructed of plastic or light gauge metal which is easily broken. Accordingly, mechanism 1 is designed to prevent starting the engine (not shown) with the projector rod 80 after breaking into bowl plate 75 and forcing upward travel at projector rod 80 by screwdriver 2 or by pulling lock mechanism 5 by reacting to these intrusions to set off the alarm.

The activation of the alarm mechanism by movement of projector rod 80 is accomplished by supplying adjustable brackets 55, 56 affixed to box 10 which bear contacts 45, 40, respectively, thereon. Contact 45 is mounted in a position juxtaposed to projector rod 80. Projector rod 80 is mounted such that adjustable contact bracket 55 is adjusted to the highest point that the projector rod 80 can attain when in the starting position normal for the vehicle (not shown), plus a 1/32 inch clearance between contact 45, 40. In this manner, any time projector rod 80 is forced beyond its normal travel, contact 45 mates to contact 40 with the upward force on projector rod 80 by the screwdriver 2 or other mechanism.

Figure 7:
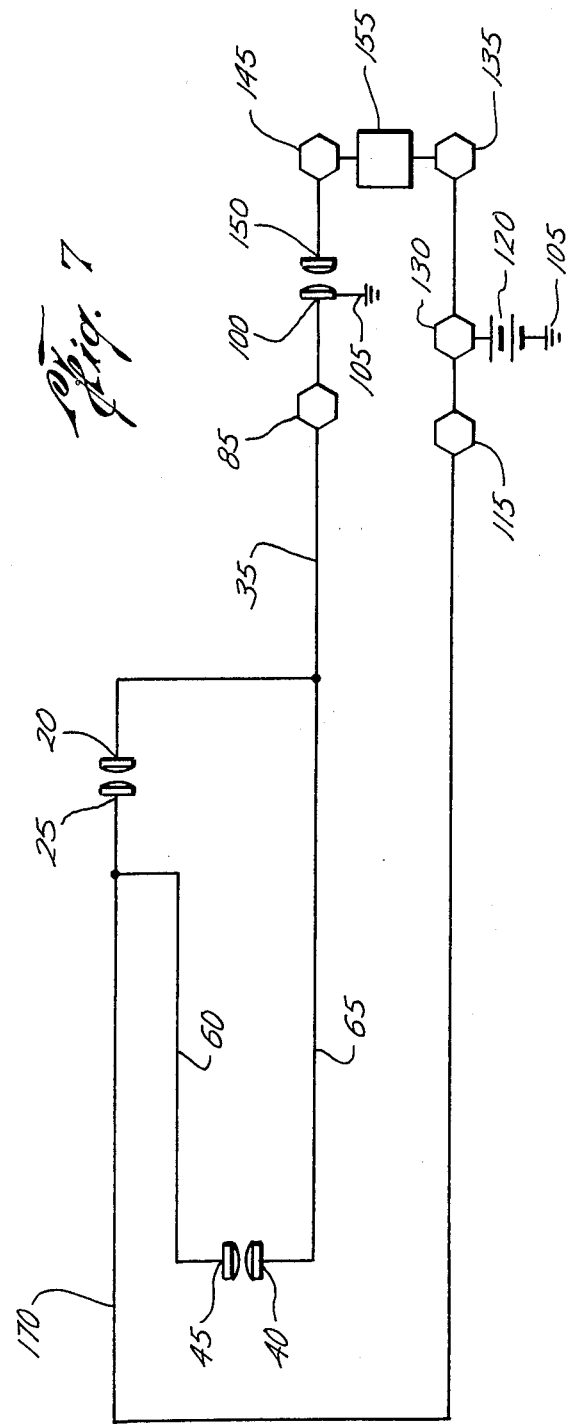
FIG. 7 is a partial wiring diagram of the preferred embodiment of the present invention.

Each of contacts 40, 45 has a contact wire 60, 65, respectively, engaging other parts of the system. As shown in FIG. 7, contact wire 60 engages the positive side 170 of the battery 120. Cotact wire 65 engages the negative side 35 of the signal fuse or belfuse 85 located in an activation box 175 (FIG. 3).

Figure 2:
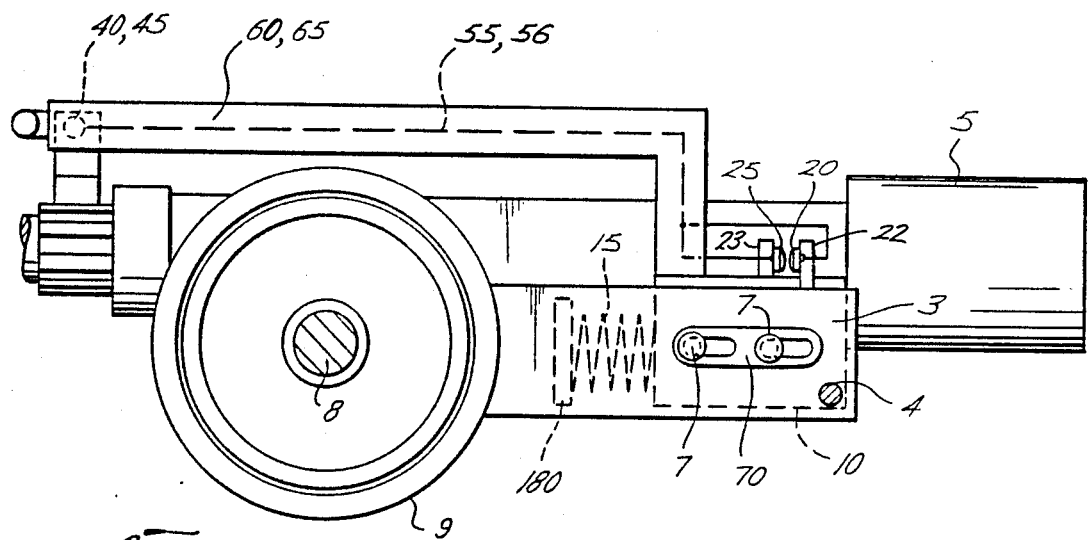
FIG. 2 is a side, partial sectional view of the portion of the apparatus of FIG. 1 showing various details.

As shown in FIGS. 1 and 2, should the lock cylinder 5 be pulled instead of tampering with projector rod 80 inside bowl plate 75, spring 15 is provided to abut at one end box 10. The other end of spring 15 is in contact with activating spring seat 180 mounted on metal bar 3. In addition, a set of brackets 22, 23 are provided, one of the brackets 23 affixed to box 10 and the other bracket 22 affixed to bar 3. Each of the brackets 22, 23 holds one of the contacts 20, 25, respectively, in juxtaposed relationship with an approximate 1/32 to 1/64 inch clearance between contacts 20, 25. Should lock mechanism 5 be removed or pulled, spring 15 will force sufficient movement of box 10 relative to bar 3 with screws 7 permitting movement of box 10 using the width of the slots in which screws 7 are mounted to permit contacts 20, 25 to meet.

Figure 3:
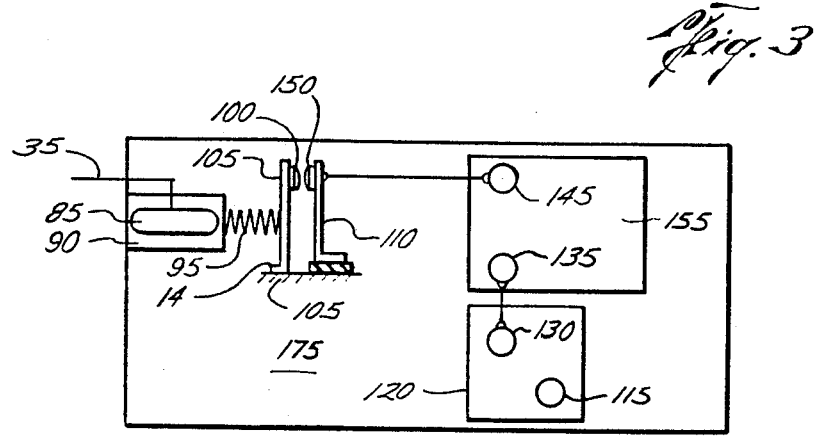
FIG. 3 is a schematic sectional view of the alarm activating mechanism of the preferred embodiment of the present invention.

The contact 25 is connected to the positive side 170 of battery 120, and contact 20 is connected to the negative side 35 of the signal fuse 85 located in an activation box 175 (FIGS. 3,7). Activation box 175 may be located anywhere in the vehicle (not shown) and would usually be placed in a non-accessible area of the vehicle.

As shown in FIG. 3, activator box 175 includes a fuse holder 90 having a signal fuse 85. Fuse 85 is made up of, for example, a one amp belfuse and is capable of melting at relatively low temperatures. As discussed above and shown in FIG. 7, wire 65 is connected to one side 35 of fuse 85. The other side of fuse 85 is connected to a unit contact 100. As shown in FIG. 3, unit contact 100 is mounted to a flexible bracket 14 and physically separated from fuse holder 90. A spring 95 is located between fuse holder 90 and unit contact 100 to maintain the tension of the fuse wire 85 which physically holds back spring 95 from expansion. Mounting bracket 14 is connected to the ground 105 of the car battery 120. Juxtaposed with contact 100 is contact 150 mounted on rubber insulator and bracket 110 to insulate contact 150 from ground 105. Contact 150 is fixed in position and connected to the negative side 145 of transmitter power supply/transmitter 155. The positive side 130 of the battery 120 is connected to positive terminal 135 of transmitter power supply/transmitter 155 at all times.

Figure 6:
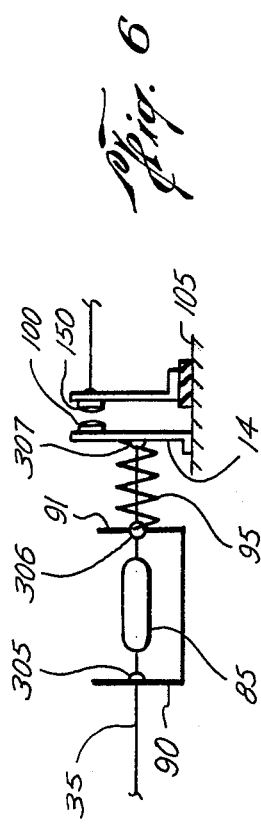
- FIG. 6 is a partial, schematical, sectional view of the fusing mechanism of the preferred embodiment of the present invention.

As shown in FIG. 6, the fuse holder 90 includes a hook 305 securing one end at the fuse wire 85. The other end of fuse wire 85 is routed through a hole 306, such as a 1/16 inch hole in a spring seat 91 at holder 90. From hole 306, the other end of fuse wire 85 is attached to a hook 307 on flexible bracket 14. The expansion length of spring 95 positioned against seat 91 allows contacts 100, 150 to mate upon release of flexible bracket 14 by fuse wire 85. A reset switch 115 (FIGS. 3, 7) would be used to turn off the transmitter 155 after the unit has been recaptured from the theft. The reset switch 115 performs its function by shutting off power from the twelve volt battery 120.

As shown in FIG. 4, a detection meter such as a radio altimeter 164 is mounted by mounting bracket 195 in a police patrol car (not shown). The receiver 160 has a warning light 200 to indicate the presence and closeness of a stolen car. If several cars approach, the car distance can be determined from the frequency by a radio altimeter 164 and the vehicle located by a direction finder such as a portable radio compass 165. Triangulation may be used to locate the particular vehicle. The meter 164 has a short range receiver 160, such as Archer mobile alert mod. no. 49-491A.

In operation, when the lock cylinder 5 is removed during the act of theft, the contacts 20, 25 are interconnected, thereby completing a circuit with regard to fuse wire 85. A similar contact make-up of contacts 40, 45 would occur if the bowl plate 75 were broken into and projector rod 80 pushed upward. With current flowing through fuse wire 85, the fuse wire 85 will melt, thereby releasing spring 95 so that contact 100 comes into contact with contact 150, thereby keying transmitter 155. Transmitter 155 would then cause a unique frequency to be emitted by the vehicle so long as the battery 120 was connected with power supply 155. A patrolman cruising would be able to determine by warning light 200 that a vehicle that has been stolen was approaching and could then, by use of radio compass 165, determine which approaching car had been stolen if there were multiple cars in the vicinity.

Because many varying and different embodiments may be made within the scope of the inventive concept herein taught including equivalent structures or materials hereinafter thought of, and because many modifications may be made in the embodiments herein detailed in accordance with the descriptive requirements of the law, it is to be understood that the details herein are to be interpreted as illustrative and not in a limiting sense.

What is claimed is:

1. A silent alarm system for vehicle theft prevention, a portion of which is mounted in the steering column, the steering column having a lock mechanism, of the vehicle, comprising:
   a first set of contacts;
   first contact means responsive to the act of pulling the lock mechanism from the steering column for causing said first set of contacts to mate;
   a second set of contacts;
   second contact means responsive to said mating of said first contacts for causing said second set of contacts to mate;
   a frequency generator;
   alarm means reponsive to said mating of said second contacts for activating an alarm signal from said frequency generator;
   wherein the steering column has a bowl plate housing a projector mechanism and there is further included:
   a third set of contacts;
   third contact means responsive to the movement of the projector mechanism for causing said third set of contacts to mate; and
   wherein said second contact means is responsive to said mating of said first contacts of said third contacts for causing said second contacts to mate.

2. A silent alarm system for vehicle theft prevention, a portion of which is mounted in the steering column, the steering column having a bowl plate housing a projector mechanism, of the vehicle, comprising:
   a first set of contacts;
   first contact means responsive to the movement of the projector mechanism for causing said first set of contacts to mate;
   a second set of contacts;
   second contact means responsive to said mating of said first contacts for causing said second set of contacts to mate;
   a frequency generator;
   alarm means responsive to said mating of said second contacts for activating an alarm from said frequency generator;

3. A silent alarm system for vehicle theft prevention, a portion of which is mounted in the steering column, the steering column having a lock mechanism and a bowl plate housing a projector mechanism of the vehicle, comprising:
   a first set of contacts;
   first contact means responsive to the act of pulling the lock mechanism from the steering column for causing said first set of contacts to mate;
   a second set of contacts;
   second contact means responsive to the movement of the projector mechanism for causing said second set of contacts to mate;
   a third set of contacts;
   third contact means responsive to said mating of said first contacts or said second contacts for causing said third set of contacts to mate;
   a frequency generator;
   alarm means responsive to said mating of said third contacts for activating an alarm signal from said frequency generator.

4. The system of claim 3, wherein said frequency generator has means for generating a single frequency.

5. A silent alarm system for vehicle theft prevention, a portion of which is mounted in the steering column, the steering column having a lock mechanism and a bowl plate housing a projector mechanism, of the vehicle, comprising:
   a first set of contacts;
   first contact means responsive to the act of pulling the lock mechanism from the steering column for causing said first set of contacts to mate;
   a second set of contacts;
   second contact means responsive to the movement of the projector mechanism for causing said second set of contacts to mate;
   a third set of contacts;
   third contact means responsive to said mating of said first contacts or said second contacts for causing said third set of contacts to mate;
   alarm means responsive to said mating of said third contacts for activating an alarm signal

* * * * *